US008960966B2

(12) United States Patent (10) Patent No.: US 8,960,966 B2
Ko (45) Date of Patent: Feb. 24, 2015

(54) BACKLIGHT UNIT

(75) Inventor: Se Jin Ko, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 12/987,748

(22) Filed: Jan. 10, 2011

(65) Prior Publication Data

US 2011/0211335 A1 Sep. 1, 2011

(30) Foreign Application Priority Data

Dec. 6, 2010 (KR) .................. 10-2010-0123704
Jan. 5, 2011 (KR) .................. 10-2011-0000877

(51) Int. Cl.
| F21V 7/04 | (2006.01) |
| F21V 7/00 | (2006.01) |
| F21V 8/00 | (2006.01) |
| G09F 13/14 | (2006.01) |
| F21K 99/00 | (2010.01) |

(52) U.S. Cl.
CPC ............ *F21V 7/0066* (2013.01); *G02B 6/0046* (2013.01); *G02B 6/0096* (2013.01); *G09F 13/14* (2013.01); *F21K 9/50* (2013.01); *G02B 6/0053* (2013.01)
USPC ........................... 362/298; 362/612; 362/623

(58) Field of Classification Search
USPC ......................................... 362/298, 623, 612
See application file for complete search history.

(56) References Cited

U.S. PATENT DOCUMENTS

| 4,989,122 A | 1/1991 | Allekotte et al. ............... 362/97 |
| 5,136,483 A * | 8/1992 | Schoniger et al. ............ 362/545 |
| 5,365,411 A | 11/1994 | Rycroft et al. .................. 362/20 |
| 7,284,893 B2 * | 10/2007 | Tseng ............................ 362/625 |
| 7,293,899 B2 * | 11/2007 | Boyd et al. ............... 362/296.07 |
| 7,350,951 B2 * | 4/2008 | Sakai et al. .................... 362/555 |
| 7,473,019 B2 * | 1/2009 | Laski ............................. 362/612 |
| 7,530,712 B2 * | 5/2009 | Lin et al. ....................... 362/247 |
| 7,922,355 B1 * | 4/2011 | Morejon et al. ............... 362/247 |
| 7,963,689 B2 * | 6/2011 | Lee ................................ 362/624 |
| 8,235,540 B2 * | 8/2012 | Park et al. ..................... 362/97.1 |
| 8,556,442 B2 * | 10/2013 | Jang et al. ..................... 362/97.1 |
| 8,596,807 B2 * | 12/2013 | Jeong et al. ................... 362/97.2 |
| 8,616,754 B2 * | 12/2013 | Ko et al. ........................ 362/623 |
| 2006/0203512 A1 * | 9/2006 | Ko et al. ........................ 362/609 |
| 2007/0147036 A1 | 6/2007 | Sakai et al. .................... 362/240 |

(Continued)

FOREIGN PATENT DOCUMENTS

| CN | 1658048 A | 8/2005 |
| CN | 101017281 | 8/2007 |

(Continued)

OTHER PUBLICATIONS

Korean Office Action dated Jan. 5, 2011.

(Continued)

*Primary Examiner* — Thomas M Sember
(74) *Attorney, Agent, or Firm* — Ked & Associates, LLP

(57) ABSTRACT

The present invention relates to a backlight unit having a reflective portion, including a light source module for emitting a light, a first reflective portion arranged spaced a first distance away from one side of the light source module to have an open region, and a second reflective portion arranged spaced a second distance which is greater than the first distance away from the other side of the light source module to have at least a portion with a sloped surface for reflecting the light toward the open region of the first reflective portion.

19 Claims, 22 Drawing Sheets

(56) References Cited

U.S. PATENT DOCUMENTS

| | | | | |
|---|---|---|---|---|
| 2007/0171626 A1* | 7/2007 | Chang | | 362/97 |
| 2007/0171676 A1* | 7/2007 | Chang | | 362/613 |
| 2007/0217193 A1* | 9/2007 | Lin et al. | | 362/245 |
| 2007/0279931 A1* | 12/2007 | Bryan et al. | | 362/600 |
| 2009/0303744 A1 | 12/2009 | Iwasaki | | |
| 2010/0118530 A1 | 5/2010 | Nagai | | 362/235 |
| 2011/0096529 A1* | 4/2011 | Wheatley et al. | | 362/97.1 |

FOREIGN PATENT DOCUMENTS

| | | |
|---|---|---|
| DE | 89 06 016 U1 | 9/1990 |
| JP | 07-072815 | 3/1995 |
| JP | 2000-011724 | 1/2000 |
| JP | WO2004/111532 | 12/2004 |
| JP | 2006-106212 A | 4/2006 |
| JP | 2006-147398 A | 6/2006 |
| JP | 2009-187904 | 8/2009 |
| JP | 2011-138658 A | 7/2011 |
| JP | 2012-531047 | 12/2012 |
| KR | 10-2006-0078576 | 7/2006 |
| KR | 10-2007-0067890 | 6/2007 |
| KR | 10-2010-0052837 | 5/2010 |
| WO | WO2009/077979 | 6/2009 |
| WO | WO2009/105450 | 8/2009 |

OTHER PUBLICATIONS

Korean Office Action dated Jul. 27, 2012.
Japanese Office Action dated Dec. 4, 2012.
Taiwanese Office Action dated Oct. 29, 2013 issued in Application No. 100100768 (with English translation).
Chinese Office Action issued in related Application No. 201110006341.6 dated Dec. 25, 2013.
European Search Report dated Jun. 20, 2014 issued in Application No. 11 150 513.7.
Japanese Office Action issued in Application No. 2013-226320 dated Aug. 5, 2014.
Chinese Office Action issued in Application No. 201110006341.6 dated Nov. 26, 2014. (Original Chinese Office Action with English Translation).

* cited by examiner

BACKLIGHT UNIT

CROSS REFERENCE TO RELATED APPLICATION

This application claims the benefit of the Patent Korean Application Nos. 10-2010-0123704, filed on Dec. 6, 2010 and 10-2011-0000877 filed on Jan. 5, 2011, which are hereby incorporated by reference as if fully set forth herein.

BACKGROUND OF THE DISCLOSURE

1. Field of the Disclosure

The present invention relates to a backlight unit having reflective portions.

2. Discussion of the Related Art

In general, as a typical large sized display device, there are LCD (Liquid Crystal Display Device), PDP (Plasma Display Panel) and so on.

Different from a spontaneous light emission type PDP, since the LCD has no light emission device for itself, the LCD requires a separate backlight unit, essentially.

In the backlight unit of the LCD, there are an edge light type backlight unit, and a direct light type backlight unit depending on positions of a light source of the backlight unit, wherein, since the edge light type has the light source arranged at a left or right side or an upper or lower side of the LCD panel for distribution of a light throughout an entire surface of the screen by using a light guide plate, the edge light type has good light uniformity and enables to fabricate a thin display device.

Since the direct light type, which is a technology used in general for the display device greater than 20", has a plurality of the light sources arranged on a lower side of the panel, the direct light type has an advantage in optical efficiency over the edge light type to use in the large sized display device that requires high brightness, mostly.

As the light source of the related art edge light type or direct light type backlight unit, a CCFL (Cold Cathode Fluorescent Lamp) is used.

However, since the backlight unit of CCFL has power always applied to the CCFL, the backlight unit has drawbacks in that a substantial amount of power is consumed, a color reproduction ratio is about 70% level compared to a CRT, and mercury contained in the CCFL causes environmental contamination.

As a substitutional product for solving above problems, active researches on the backlight unit with an LED (Light Emitting Diode) are underway, presently.

If the LED is used in the backlight unit, since local turn on/off is possible, substantial reduction of power consumption is possible, and RGB LEDs having a color reproduction range well over 100% of the NTSC (National Television System Committee) specification can provide a lively picture to consumers.

Moreover, it is a feature that the LED manufactured by a semiconductor fabrication process is harmless to the environment.

Though LCD products which adopt the LED that has above advantages appear in succession, since the products have driving mechanisms different from the related art CCFL light source, the drivers, and PCB boards are expensive.

Consequently, the LED backlight unit is applied only to high price LCD products, still.

SUMMARY OF THE DISCLOSURE

Accordingly, the present invention is directed to a backlight unit.

An object of the present invention is to provide a backlight unit in which a light source module is positioned between two reflective portions each having an air guide for providing a light of uniform brightness, and which can simplify a structure thereof.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a backlight unit can include a light source module for emitting a light, a first reflective portion arranged spaced a first distance away from one side of the light source module to have an open region, and a second reflective portion arranged spaced a second distance which is greater than the first distance away from the other side of the light source module to have at least a portion with a sloped surface for reflecting the light toward the open region of the first reflective portion.

In this instance, the first reflective portion can have an opened center region, and the light source module can include a first light source module and a second light source module arranged at opposite edges of the first reflective portion to face each other.

And, the first reflective portion can have one opened side region, and the light source module can be arranged at the other edge region of the first reflective portion.

And, the sloped surface of the second reflective portion can be one of a flat surface, a downward curved surface, or an upward curved surface.

Then, the second reflective portion can have at least a portion of which slope angle has a pattern in which the slope angle decreases in middle of increase, or the second reflective portion can have at least a portion of which slope angle has a pattern in which the slope angle decreases in middle of no change of the slope angle after increase of the slope angle.

Next, the second reflective portion can include a first sub-reflective portion having a first sloped surface, and a second sub-reflective portion connected to an end of the first sub-reflective portion to have a first sloped surface formed to have a slope angle different from the slope angle of the first sloped surface.

And, the backlight unit can further include a cover frame for supporting the first and second reflective portions and the light source module, wherein the cover frame can include a first supporting portion arranged parallel to the first reflective portion for supporting the first reflective portion, the first reflective portion having an open region, and a second supporting portion extended perpendicular to the first reflective portion from an end of the first reflective portion for supporting the light source module, and a third supporting portion extended parallel to the first reflective portion from an end of the second reflective portion for supporting the second reflective portion.

Then, the second reflective portion can include a bottom plate having a sloped surface sloped at an angle from a horizontal plane parallel to a surface of the first reflective portion, and a reflective sheet formed on the sloped surface of the bottom plate.

In this instance, the reflective sheet can be formed on a portion or an entire surface of the sloped surface, and the reflective sheet can have the same reflectivity throughout the sloped surface or different reflectivity at a portion thereof.

Depending on cases, the bottom plate has a recess in an entire, or a portion of, the sloped surface, and the reflective sheet is formed in the recess in the bottom plate.

Next, the first reflective portion has one side surface opposite to the second reflective portion with a saw-tooth shaped reflective pattern, and a surface of the reflective pattern is flat or curved.

In another aspect of the present invention, a backlight unit can include a light source module for emitting a light, a first reflective portion arranged in contact with one side of the light source module to have an open region, and a second reflective portion arranged spaced a distance away from the other side of the light source module to have at least a portion with a sloped surface for reflecting the light toward the open region of the first reflective portion.

And, in another aspect of the present invention, a backlight unit can include a first reflective portion having an opened center region, a second reflective portion arranged opposite to, and a distance away from an underside surface of the first reflective portion to have an air guide therebetween, first and second light source modules arranged at opposite regions between the first and second reflective portions opposite to each other, wherein the second reflective portion can include a first sloped surface positioned on a lower side of the first light source module sloped in a second light source module direction, a second sloped surface extended from the first sloped surface to opposite to the first sloped surface and sloped in a first light source module direction, a third sloped surface extended from the second sloped surface and sloped in a second light source module direction, and a fourth sloped surface extended from the third sloped surface to opposite to the third sloped surface and position on a lower side of the second light source module and sloped in a first light source module direction.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Figure 1A:
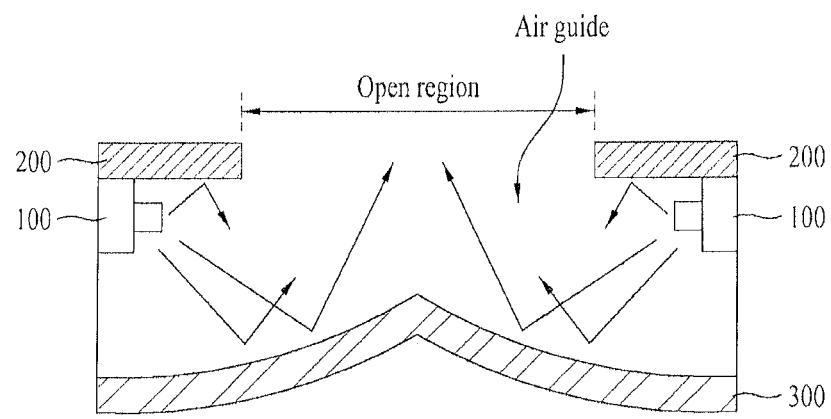
FIGS. 1A and 1B illustrate schematic views each showing a two edge type backlight unit in accordance with a preferred embodiment of the present invention.

Reference will now be made in detail to the specific embodiments of the present invention, examples of which are illustrated in the accompanying drawings. Wherever possible, the same reference numbers will be used throughout the drawings to refer to the same or like parts.

It is required to understand that, in a description that a layer (a film), a region, a pattern, or a structure is formed "on" or "under" a substrate, a layer (a film) a region, a pad, or pattern, the "on", or "under" implies that the layer (the film), the region, the pattern, or the structure is formed directly or indirectly. And, reference on the "on" or "under" is the drawing.

A thickness or a size of a layer shown in a drawing is exaggerated, omitted or shown schematically for convenience or clarity of description. And, a size of an element is not shown to scale, perfectly.

Figure 1B:
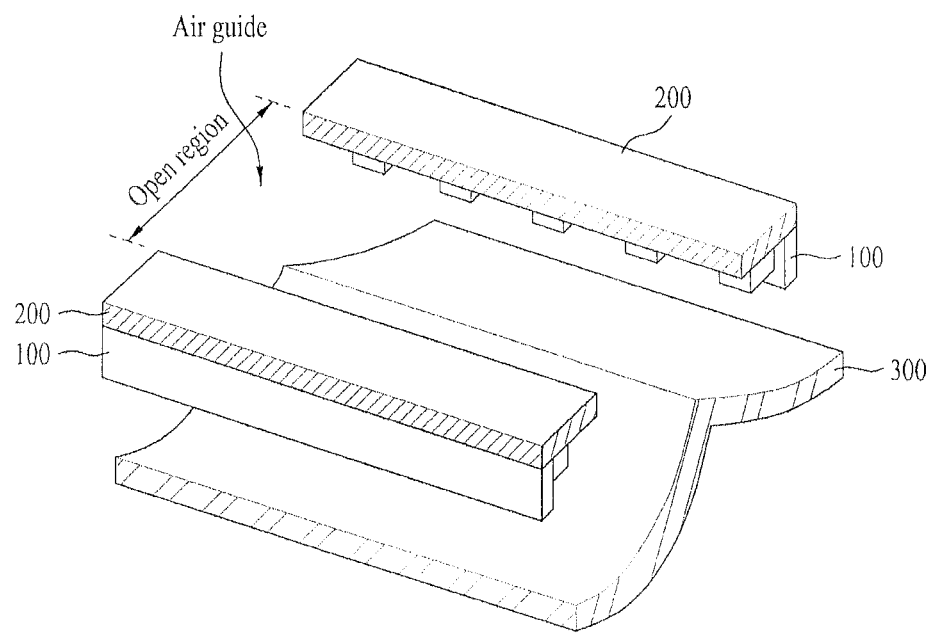

FIGS. 1A and 1B illustrate schematic views each showing a two edge type backlight unit in accordance with a preferred embodiment of the present invention, wherein FIG. 1A illustrates a section thereof and FIG. 1B illustrates a perspective view thereof.

Referring to FIGS. 1A and 1B, the backlight unit can include a light source module 100, a first reflective portion 200 and a second reflective portion 300.

In this instance, the light source module 100 is positioned between the first reflective portion 200 and the second reflective portion 300 adjacent to the first reflective portion 200.

And, the light source module 100 can include a circuit board having an electrode pattern and a light emission device for emitting a light.

In this instance, the circuit board can have at least one light emission device mounted thereon, and the electrode pattern for connecting a power supply adapter to the light emission device formed thereon.

For an example, the circuit board can have a carbon nanotube electrode pattern formed thereon for connecting the adapter to the light emission device.

The circuit board can be a PCB (Printed Circuit Board) of polyethylene terephthalate (PET), glass, polycarbonate PC, or silicon (Si) for mounting a plurality of light sources 100 thereon, or can be formed as a film shape.

In the meantime, the light emission device can be a light emission diode (LED) chip having a blue LED chip or an UV LED chip, or a package having a combination of at least one or more than one of red LED chip, green LED chip, blue LED chip, yellow green LED chip, and white LED chip.

And, the white LED can be produced by combining yellow phosphor with the blue LED or using red phosphor and green phosphor at a time.

In order to have an air guide in an empty space between the first reflective portion 200 and the second reflective portion 300, the first reflective portion 200 and the second reflective portion 300 can be spaced a distance away from, and opposite to, each other.

In this instance, the first reflective portion 200 has an open region, and is arranged in contact with one side of, or spaced from, the light source module 100.

That is, the first reflective portion 200 has an open center region, and the light source module 100 can include a first light source module and a second light source module arranged opposite to each other at opposite edge region of the first reflective portion 200.

And, the first reflective portion 200 is formed of a reflective coating film or a reflective coating material, for reflecting the light from the light source module 100 toward the second reflective portion 300.

The first reflective portion 200 has a surface opposite to the light source module 100 with a saw-tooth shaped reflective pattern formed thereon, wherein the reflective pattern can have a flat or curve surface.

The reflective pattern is formed on the surface of the first reflective portion 200 for reflecting the light from the light source module toward the center region of the second reflective portion 300 to increase brightness of the center region of the backlight unit.

Next, the second reflective portion 300 is arranged spaced a distance away from the light source module 100 and can have a sloped surface sloped at an angle from a horizontal plane parallel to the surface of the first reflective portion 200.

In this instance, the sloped surface of the second reflective portion 300 serves to reflect the light from the light source module 100 or reflected at the first reflective portion 200 to the open region of the first reflective portion 200.

And, it is preferable that a distance between the second reflective portion 300 and the light source module 100 is greater than a distance between the first reflective portion 200 and the light source module 100.

This is for increasing brightness of the center region of the backlight unit by making the light from the light source module to converge on the center region more.

Figure 2:
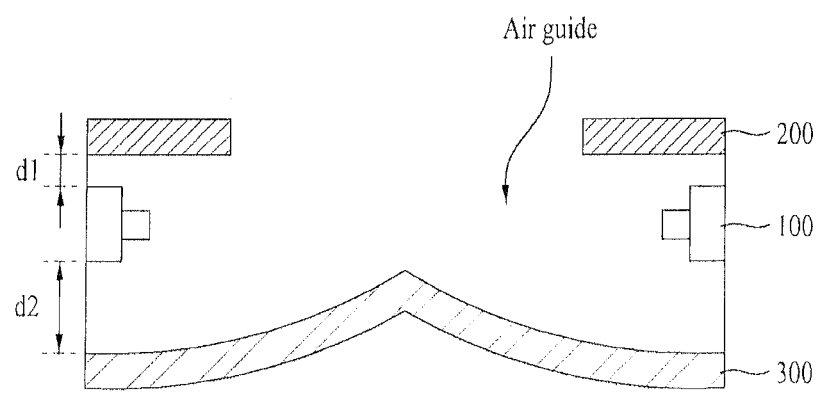
FIG. 2 illustrates a schematic view showing a configuration of the light source module and the first and second reflective portions in FIG. 1.

FIG. 2 illustrates a schematic view showing a configuration of the light source module and the first and second reflective portions in FIG. 1.

Referring to FIG. 2, it can be noticed that a first distance d1 between the first reflective portion 200 and the light source module 100 is smaller than a second distance d2 between the second reflective portion 300 and the light source module 100.

That is, the light source module 100 is positioned at opposite sides in the air guide between the first and second reflective portions 200 and 300 and arranged adjacent to the first reflective portion 200 more than the second reflective portion 300.

Thus, since the second reflective portion 300 has the surface opposite to the first reflective portion 200 sloped at an angle from the horizontal plane, a distance between the first reflective portion 200 and the second reflective portion 300 can be greater at a region close to the light source module 100 than at a region far from the light source module 100.

Figure 3A:
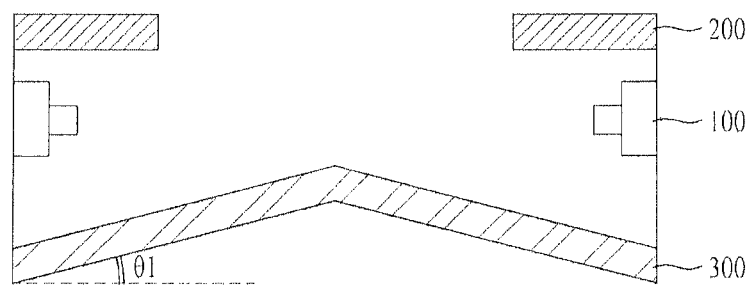
FIGS. 3A to 3D illustrate schematic views each showing a sloped surface of a second reflective portion.
Figure 3B:
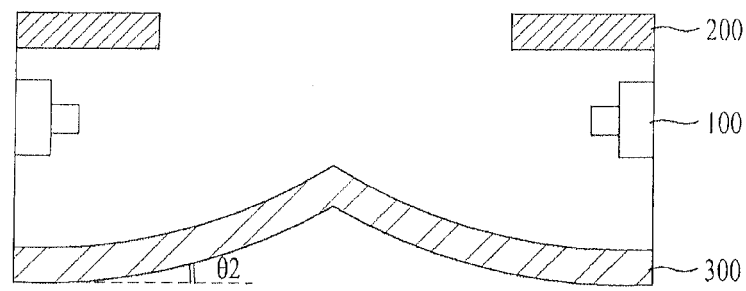
Figure 3C:
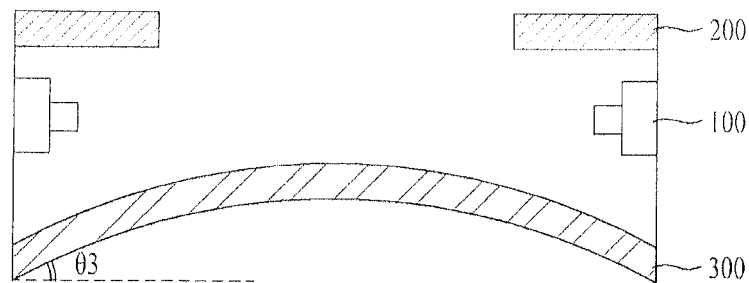
Figure 3D:
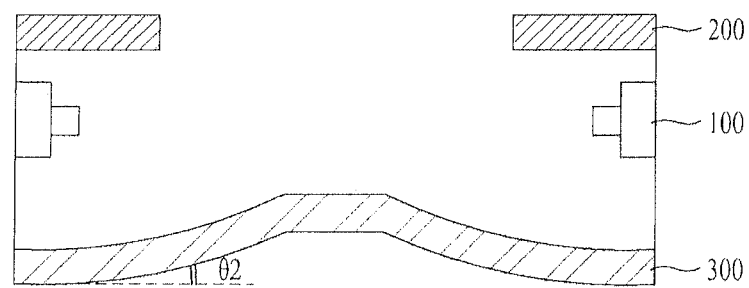

FIGS. 3A to 3D illustrate schematic views each showing the sloped surface of the second reflective portion, wherein FIG. 3A illustrates a flat sloped surface and FIGS. 3B to 3D illustrate curved sloped surfaces, respectively.

Referring to FIG. 3A, the sloped surface of the second reflective portion 300 can be flat with the angle $\theta 1$ between the sloped surface of the second reflective portion 300 and the horizontal plane parallel to the surface of the first reflective portion 200 being approx. 1~85 degrees.

And, referring to FIG. 3B, the sloped surface of the second reflective portion 300 can be a downward curved surface with the angle $\theta 2$ between the sloped surface of the second reflective portion 300 and the horizontal plane parallel to the surface of the first reflective portion 200 being increasing gradually from approx. 1~85 degrees.

Then, referring to FIG. 3C, the sloped surface of the second reflective portion 300 can be an upward curved surface with the angle $\theta 3$ between the sloped surface of the second reflective portion 300 and the horizontal plane parallel to the surface of the first reflective portion 200 being decreasing gradually from approx. 1~85 degrees.

Thus, though the sloped surface of the second reflective portion 300 can have a pattern in which at least the slope angle of a portion thereof decreases in middle of increase, as shown in FIG. 3D, the slope angle of at least a portion of the second reflective portion 300 can have a pattern in which the slope angle decreases in middle of no change of the slope angle after the slope angle increases.

Thus, the sloped surface of the second reflective portion 300 can have additional sloped surfaces added to both ends of the second reflective portion 300.

Figure 4A:
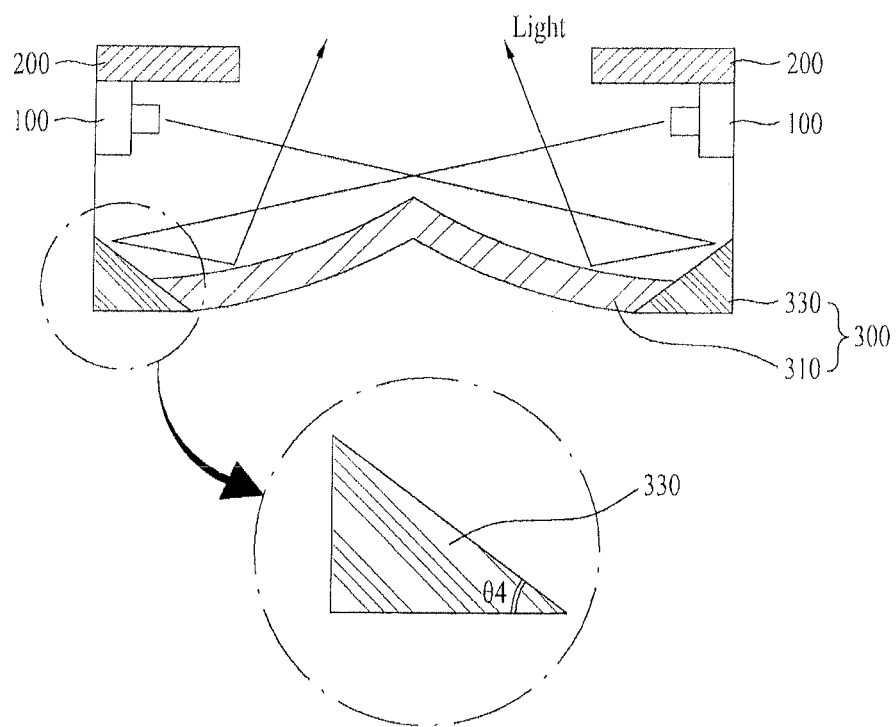
FIGS. 4A and 4B illustrate schematic views each showing a second reflective portion having a plurality of sloped surfaces.
Figure 4B:
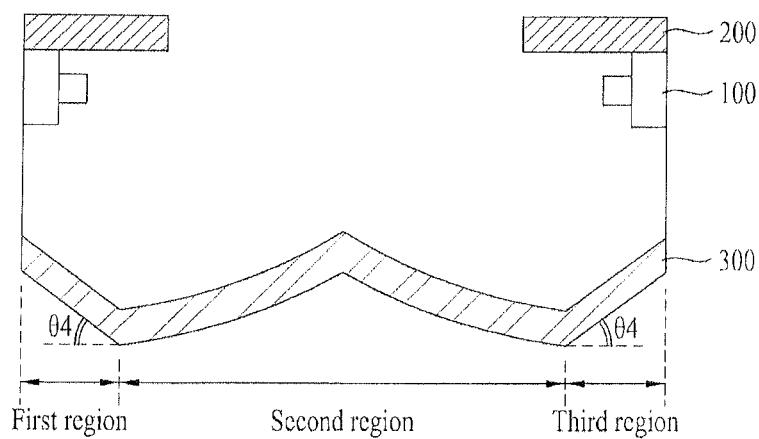

FIGS. 4A and 4B illustrate schematic views each showing a second reflective portion having a plurality of sloped surfaces, wherein FIG. 4A illustrates the second reflective portion having two types of reflective portions, and FIG. 4B illustrates the second reflective portion having two types of sloped surfaces.

Referring to FIG. 4A, the second reflective portion 300 can include a first sub-reflective portion 330 and a second sub-reflective portion 310.

In this instance, the first sub-reflective portion 330 is positioned on a lower side of one side light source module 100 to have a first sloped surface sloped in a light source module 100 direction on the other side.

And, the second sub-reflective portion 310 is positioned at the center region and connected to an end of the first sub-reflective portion 330 to have a second sloped surface opposite to the first sloped surface.

In this instance, an angle $\theta 4$ between the sloped surface of the first sub-reflective portion 330 and the horizontal plane parallel to the surface of the first reflective portion 200 can be approx. 1~85 degrees.

Thus, the first sub-reflective portion 330 is arranged additionally for increasing brightness of the center region of the backlight unit by reflecting the light from the light source module at the other side to the center region of the second reflective portion 300.

Depending on cases, the slope angle of the sloped surface of the first sub-reflective portion 330 can be different from the slope angle of the sloped surface of the second sub-reflective portion 310.

Referring to FIG. 4A, though the first sub-reflective portion 330 can be a reflective structural body of a reflective material, the first sub-reflective portion 330 can be a reflective film as shown in FIG. 4B.

FIG. 4B illustrates the second sub-reflective portion 310 of the reflective film having a sloped surface formed additionally to the reflective film.

Referring to FIG. 4B, the second reflective portion 300 can include a first sloped surface formed at a first region, and a second sloped surface formed at a second region.

In this instance, the second region is the center region and the first region is a peripheral region around the center region.

The first sloped surface can be positioned on a lower side of the light source module 100 and sloped in the light source module 100 direction on the other side.

And, the second sloped surface is an extension from the first sloped surface to have a slope opposite to the first sloped surface.

In this instance, an angle θ4 between the first sloped surface and the horizontal plane parallel to the surface of the first reflective portion 200 is approx. 1~85 degrees.

Thus, the second reflective portion 300 has the sloped surfaces for converging reflection of the light from the first reflective portion 200 and the light source module 100 to the open region of the first reflective portion 200. Depending on cases, a height of an end of the sloped surface can vary.

Figure 5A:
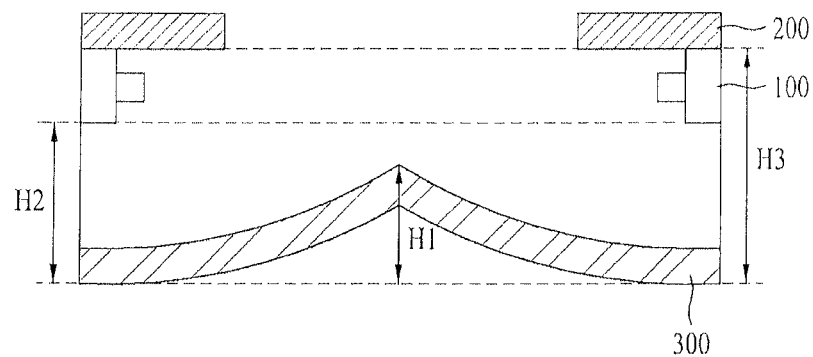
FIGS. 5A and 5B illustrate schematic views each showing a height of an end of a sloped surface of a second reflective portion.
Figure 5B:
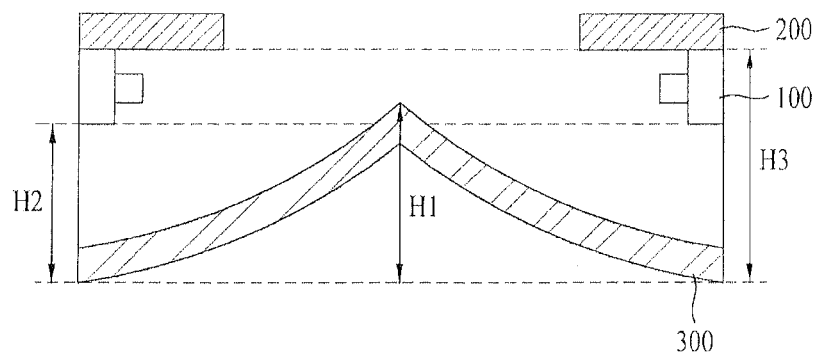

FIGS. 5A and 5B illustrate schematic views each showing the height of the end of the sloped surface of the second reflective portion.

FIG. 5A illustrates a case when the height of the end of the sloped surface of the second reflective portion 300 is positioned on a lower side of an arrange line of the light source module, and FIG. 5B illustrates a case when the height of the end of the sloped surface of the second reflective portion 300 is positioned on an upper side of an arrange line of the light source module.

Referring to FIG. 5A, a greatest height H1 from a lower side horizontal plane positioned at an one side end of the second reflective portion 300 to a projected portion positioned at the center region of the second reflective portion 300 can be smaller than both a height H2 from the horizontal plane to the light source module 100 and a height H3 from the horizontal plane to the first reflective portion 200.

And, referring to FIG. 5B, a greatest height H1 from a lower side horizontal plane positioned at an one side end of the second reflective portion 300 to a projected portion positioned at the center region of the second reflective portion 300 can be greater than a height H2 from the horizontal plane to the light source module 100 and smaller than a height H3 from the horizontal plane to the first reflective portion 200.

Depending on cases, the height H2 from the horizontal plane to the light source module 100 positioned at an one side end of the second reflective portion 300 can be the same with the height H1 from the horizontal plane to the other side end of the second reflective portion 300, or the height H2 from the horizontal plane to the light source module 100 positioned at an one side end of the second reflective portion 300 can be greater than the height H1 from the horizontal plane to the other side end of the second reflective portion 300.

The light source module 100, and the first and second reflective portions 200 and 300 can be supported by the cover frame.

Figure 6:
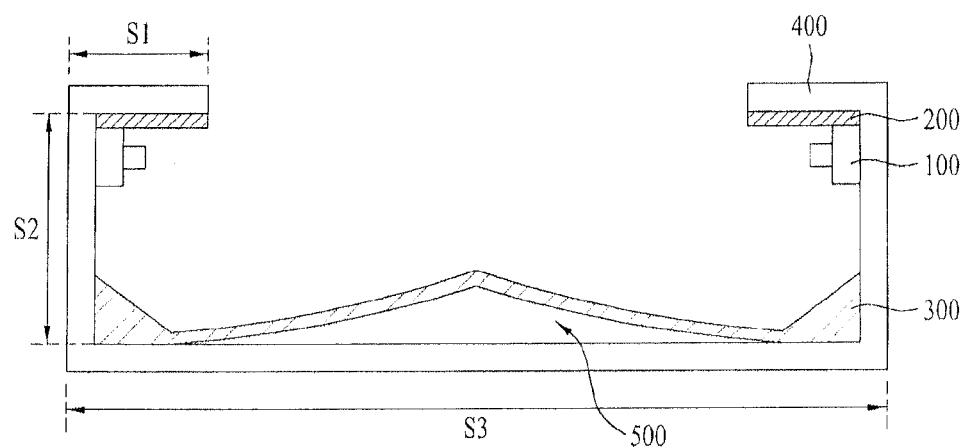
FIGS. 6 to 8 illustrate schematic views each showing a cover frame for supporting a light source module and first and second reflective portions.
Figure 7:
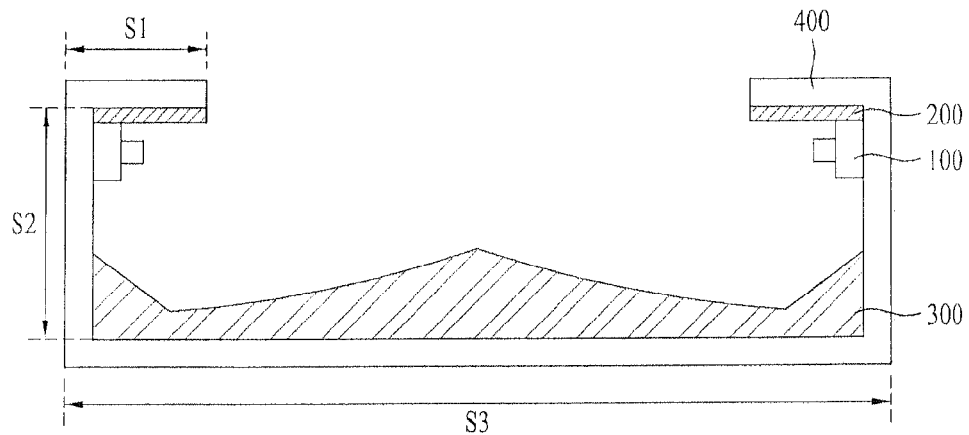
Figure 8:
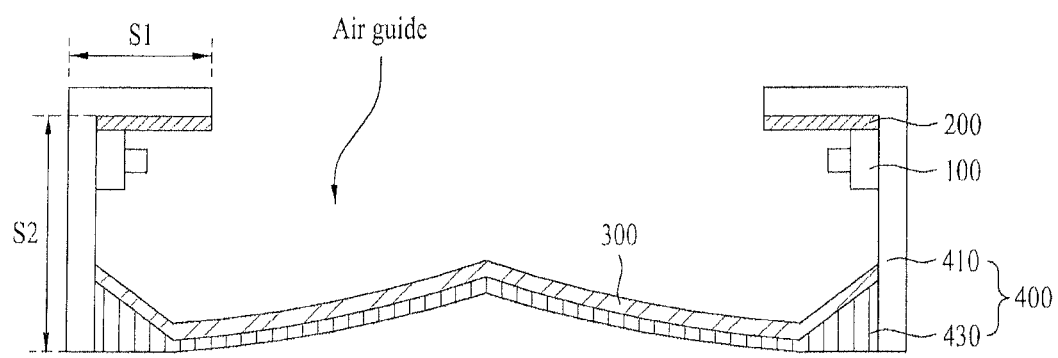

FIGS. 6 to 8 illustrate schematic views each showing the cover frame for supporting the light source module and the first and second reflective portions.

FIG. 6 illustrates a schematic view showing the cover frame 400 for supporting a lower end of the second reflective portion 300, FIG. 7 illustrates a schematic view showing the cover frame 400 for supporting an entire surface of a lower side of the second reflective portion 300, and FIG. 8 illustrates a schematic view showing the cover frame 400 formed to have a shape the same with the second reflective portion for supporting an entire surface of the lower side of the second reflective portion 300.

At first, referring to FIG. 6, the cover frame 400 is arranged to support the first and second reflective portions 200 and 300, and the light source module 100.

In this instance, the cover frame 400 can include first, second, and third supporting portions S1, S2, and S3.

The first supporting portion S1 of the cover frame 400 can support the first reflective portion 200, arranged in a direction parallel to the first reflective portion 200, and have an open region at a center portion.

Then, the second supporting portion S2 can support the light source module 100, and have an extension from an end of the first supporting portion S1 perpendicular to the first reflective portion 200.

And, the third supporting portion S3 can support the second reflective portion 300, and have an extension from an end of the second supporting portion S2 parallel to the first supporting portion S1.

In this instance, the third supporting portion S3 can be formed of a material the same with the first, and second first supporting portions S1 and S2, and support a lower end of the second reflective portion 300.

The first, second, and third supporting portions S1, S2, and S3 can be formed of a metal or polymer resin.

And, the second reflective portion 300 can be spaced from the third supporting portion S3 at a lower side center region by a predetermined gap to form an air guide 500.

In this instance, the second reflective portion 300 can be a reflective sheet in a shape of a reflective film.

The second reflective portion 300 formed as the reflective sheet can have first, second, third, and fourth sloped surfaces.

The first sloped surface of the second reflective portion 300 can be positioned on a lower side of the first light source module 100 positioned at one side and sloped in a second light source module 100 direction positioned at the other side, the second sloped surface can be extended from the first sloped surface opposite to the first sloped surface and sloped in a first light source module 100 direction, the third sloped surface can be extended from the second sloped surface and sloped in a second light source module 100 direction, and the fourth sloped surface can be extended from the third sloped surface opposite to the third sloped surface, positioned at a lower side of the second light source module 100, and sloped in a first light source module 100 direction.

Next, referring to FIG. 7, the third supporting portion S3 of the cover frame 400 is formed of a material the same with the first, and second supporting portions S1 and S2, and can support an entire surface of a lower side of the second reflective portion 300.

In this instance, the second reflective portion 300 can be a reflective structural body of a reflective material.

The second reflective portion 300 which is the reflective structural body can have first and second grooves.

The first groove is formed along the first light source module 100 at a region adjacent to the first light source module 100 positioned at one side, and can have opposite sloped sides, and the second groove is formed along the second light source module 100 at a region adjacent to the second light source module 100 positioned at the other side, and can have opposite sloped sides.

In this instance, the first groove and the second groove can be symmetry with respect to the center region of the second reflective portion 300.

And, the third supporting portion S3 can be formed of a material the same with the first, and second supporting portions S1 and S2, and serve to support a lower side of the second reflective portion 300.

In this instance, the first, second, and third supporting portions S1, S2, and S3 can be formed of a metal or polymer resin.

And, referring to FIG. 8, the third supporting portion S3 can be formed of a material different from the first and second supporting portions S1 and S2, and can support an entire surface of a lower side of the second reflective portion 300.

The third supporting portion S3 can be formed to have the same shape with the second reflective portion 300 such that the third supporting portion S3 can have a sloped surface the same with the second reflective portion 300.

Accordingly, the third supporting portion S3 can be formed of the polymer resin, such as plastic, for easy and simple fabrication in a shape the same with the second reflective portion 300.

And, the first, and second supporting portions S1 and S2 can be formed of a metal and connected to the third supporting portion S3.

That is, referring to FIG. 8, the cover frame 400 can have a metal frame 410 and polymer resin frame 430.

Depending on cases, the polymer resin frame 430 having the second reflective portion 300 attached thereto can be fabricated individually and connected to the cover frame 400.

Figure 9A:
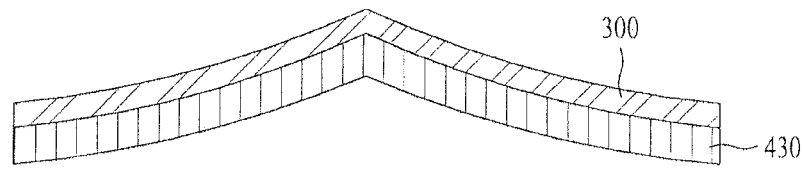
FIGS. 9A and 9B illustrate schematic views each showing a shape of a frame having a second reflective portion attached to an entire surface thereof.
Figure 9B:
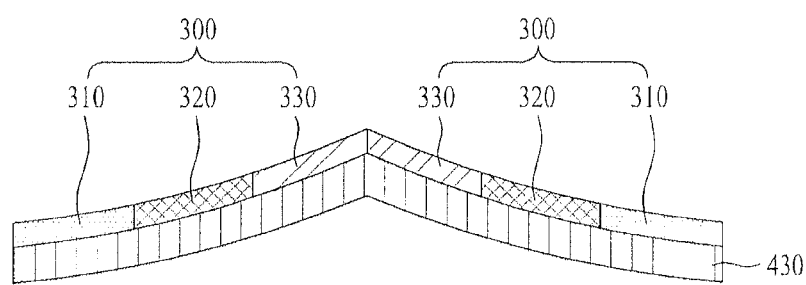

FIGS. 9A and 9B illustrate schematic views each showing a shape of a frame having a second reflective portion attached to an entire surface thereof, wherein FIG. 9A illustrates a case when reflectivity of the second reflective portion is the same throughout the second reflective portion 300, and FIG. 9B illustrates a case when reflectivity of the second reflective portion is not same throughout the second reflective portion 300.

Referring to FIGS. 9A and 9B, the second reflective portion 300 can be the reflective coating fabricated in a film shape, or the reflective coating material layer having a reflective material deposited thereon.

The second reflective portion 300 can include at least one of metal or metal oxide, such as aluminum, silver Ag, gold Au, or titanium dioxide $TiO_2$ which have high reflectivity.

In this case, the second reflective portion 300 can be formed by depositing or coating metal or metal oxide on the polymer resin 430 which is a bottom plate, or printing metal ink.

In this instance, the metal or metal oxide can be deposited by vapor deposition such as thermal deposition, vapor deposition, or sputtering, or by printing, gravure coating or silk screen method.

And, the second reflective portion 300 can be formed by fabricating in a shape of a film or a sheet, and attaching the same to the polymer resin frame 430.

In this instance, referring to FIG. 9A, the second reflective portion 300 can be a structure having the same reflectivity throughout the polymer resin frame which is the bottom plate, or referring to FIG. 9B, the second reflective portion 300 can be a structure having a plurality of reflective layers 310, 320, and 330 with reflectivity different from one another formed throughout the polymer resin frame 430.

The reason the second reflective portion 300 is constructed of the plurality of reflective layers with reflectivity different from one another lies on that, if reflective layers having the same reflectivity are only formed, the optical reflectivity is not uniform throughout an entire reflective surface causing brightness of the backlight unit not uniform throughout the backlight unit.

Accordingly, by forming the reflective layer having relatively high reflectivity at a region brightness of the light is displayed low, or forming the reflective layer having relatively low reflectivity at a region brightness of the light is displayed high, the brightness throughout the backlight unit can be corrected uniform.

Figure 10A:
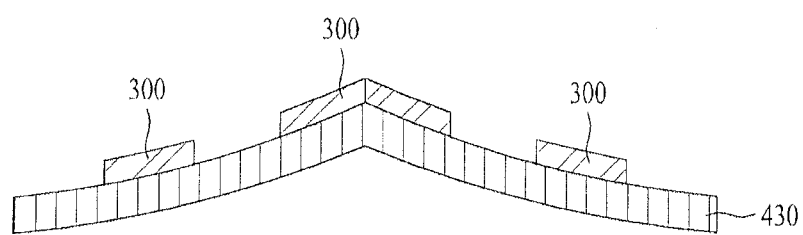
FIGS. 10A and 10B illustrate schematic views each showing a shape of a frame having a second reflective portion attached to a portion thereof.
Figure 10B:
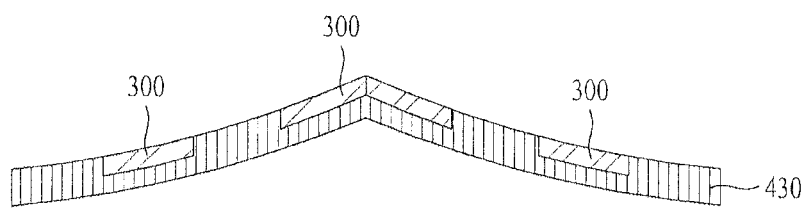

FIGS. 10A and 10B illustrate schematic views each showing a shape of a frame having a second reflective portion attached to a portion thereof, wherein FIG. 10A illustrates a schematic view of the second reflective portion projected from a surface of the polymer resin frame, and FIG. 10B illustrates a schematic view of the second reflective portion recessed in the surface of the polymer resin frame.

Alike FIG. 9B, embodiments in FIGS. 10A and 10B also form the reflective layer only at a reflective surface region displaying the brightness of the light low for correcting the brightness throughout the backlight unit uniform.

The embodiment in FIG. 10A can have the reflective layer of the second reflective portion 300 projected from a portion of the surface of the polymer resin frame 430.

And, the embodiment in FIG. 10B can have the reflective layer of the second reflective portion 300 recessed in a recess formed in a portion of the surface of the polymer resin frame 430.

Thus, though the second reflective portion 300 can be formed on an entire region of the polymer resin frame 430, or can be formed only at a region of which brightness of the light is low relatively.

Depending on cases, the second reflective portion 300 can have a predetermined shape of reflective pattern on a surface thereof.

FIGS. 11A to 11D illustrate schematic views each showing a second reflective portion having a reflective pattern.

Figure 11A:
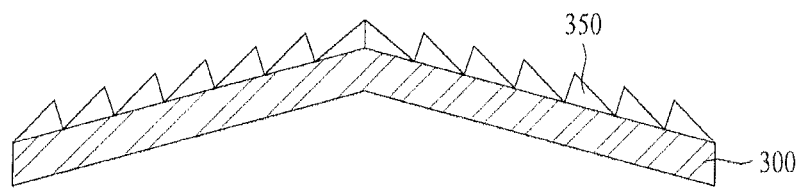
FIGS. 11A to 11D illustrate schematic views each showing a second reflective portion having a reflective pattern.
Figure 11B:
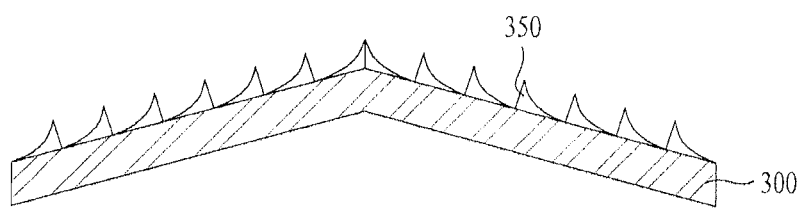
Figure 11C:
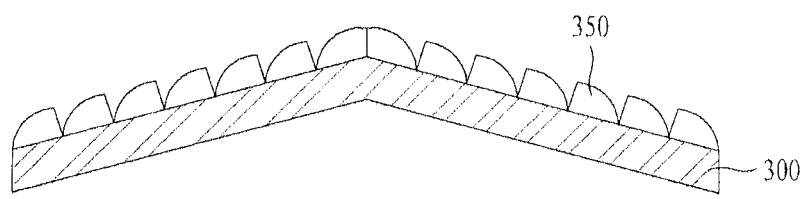

FIG. 11A illustrates a saw-tooth shaped reflective pattern 350, and the reflective pattern 350 can have a flat surface, and FIGS. 11B and 11C illustrate saw-tooth shaped reflective patterns 350 respectively, and the reflective patterns 350 can have curved surfaces, respectively.

In this instance, the saw-tooth shaped reflective pattern 350 in FIG. 11B has an upward curved surface, and the saw-tooth shaped reflective pattern 350 in FIG. 11C has a downward curved surface.

Figure 11D:
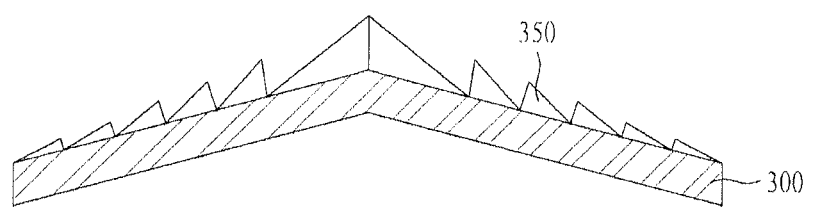

Depending on cases, referring to FIG. 11D, a size of the reflective pattern 350 can become the greater as the reflective pattern goes from an end to a center portion of the second reflective portion 300 the more.

The reflective pattern 350 is formed on the second reflective portion 300 thus for providing, not only a reflection effect of the light, but also a diffusion effect of the light which spreads the light uniformly.

Therefore, the reflective pattern 350 can be formed in a variety of sizes on a relevant region according to an overall brightness distribution of the backlight unit.

In the meantime, the first reflective portion 200 can influence to brightness uniformity of the backlight unit depending of a thickness and a length thereof.

Figure 12:
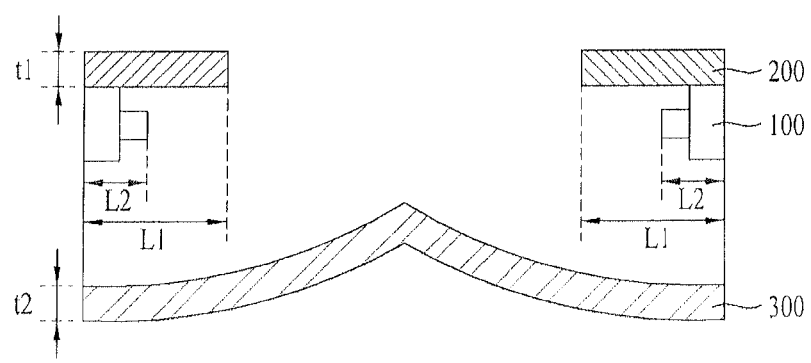
FIGS. 12 and 13 illustrate schematic views for explaining thickness and length conditions of the first reflective portion.
Figure 13:
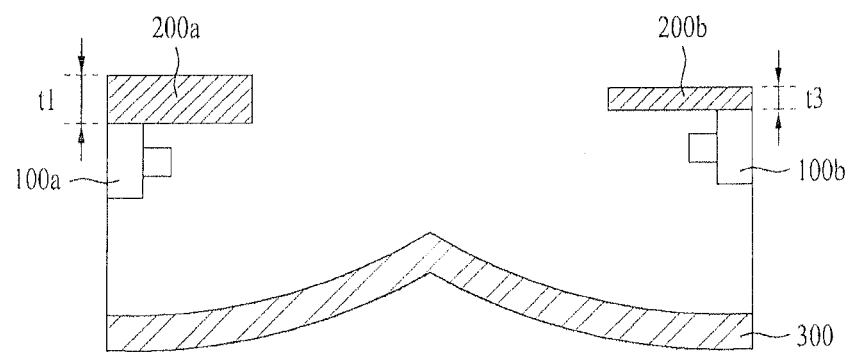

FIGS. 12 and 13 illustrate schematic views for explaining thickness and length conditions of the first reflective portion.

Referring to FIG. 12, the first reflective portion 200 can have a length L1 from one end to the other end positioned in an open region direction, and the light source module 100 can have a length L2 from one end to the other end positioned in an open region direction.

In this instance, the length L1 of the first reflective portion 200 can be 5 to 10 times of the length L2 of the light source module 100.

And, the thickness t1 of the first reflective portion 200 can be the same with or different from the thickness t2 of the second reflective portion 300.

Most preferably, it is favorable that the thickness t1 of the first reflective portion 200 is greater than the thickness t2 of the second reflective portion 300.

And, referring to FIG. 13, depending on cases, the thickness t1 of the first reflective portion 200a positioned at one side of the open region can be the same with or different from the thickness t3 of the first reflective portion 200b positioned at the other side of the open region.

And, lengths of the first reflective portions 200a and 200b positioned on both sides of the open region can be different from each other.

This is because intensity of light emission from the light source modules 100 arranged on both sides of the open region can be different from each other.

That is, the first reflective portion 200 arranged above the light source module 100 having relatively high intensity of light emission is required to be thicker and longer relatively for shielding the light.

Figure 14A:
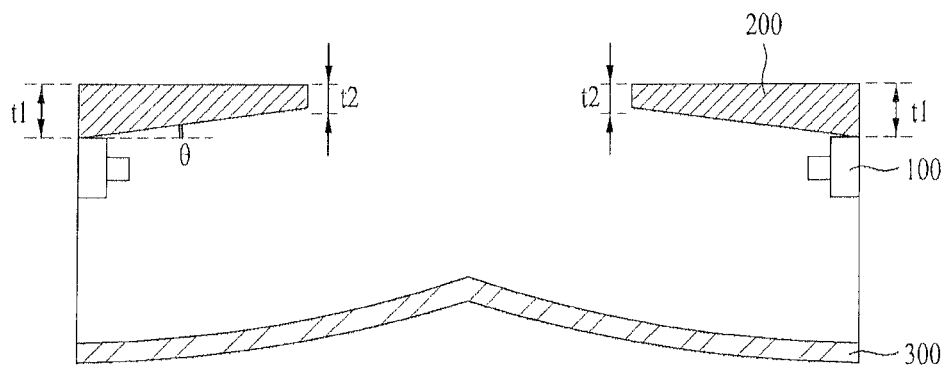
FIGS. 14A and 14B illustrate schematic views each showing a first reflective portion having a sloped surface.
Figure 14B:
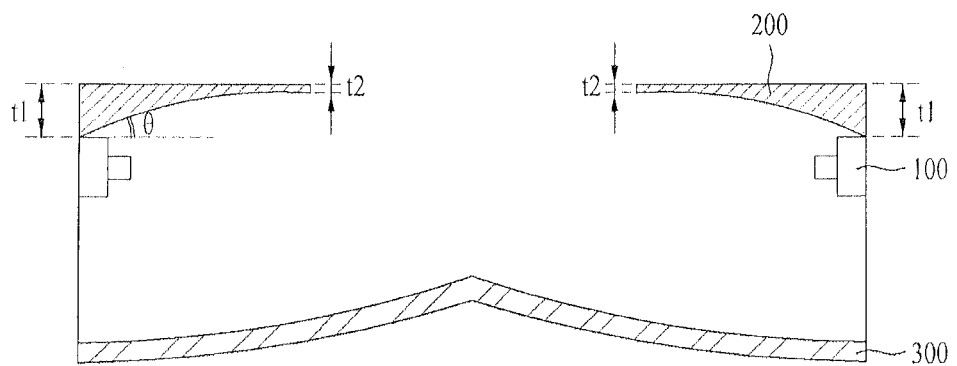

FIGS. 14A and 14B illustrate schematic views each showing a first reflective portion having a sloped surface, wherein FIG. 14A illustrates a case the sloped surface is flat, and FIG. 14B illustrates a case the sloped surface is curved.

Referring to FIGS. 14A and 14B, one side surface of the first reflective portion 200 can have a sloped surface sloped at an angle with respect to the other side surface of the first reflective portion 200.

In this instance, the sloped surface can be sloped at an angle of 1~85 degrees with respect to a horizontal plane parallel to the other side surface of the first reflective portion 200.

Accordingly, the thickness of the first reflective portion 200 decreases as the first reflective portion 200 goes the farther from the light source module 100.

And, the surface of the first reflective portion can have a predetermined reflective pattern.

FIGS. 15A to 15D illustrate schematic views each showing the first reflective portion having the reflective pattern.

Figure 15A:
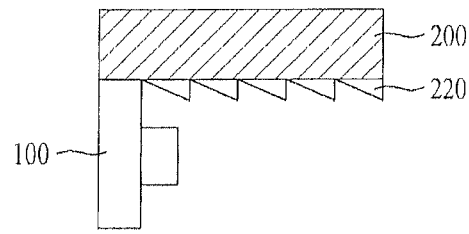
FIGS. 15A to 15D illustrate schematic views each showing a first reflective portion having a reflective pattern.
Figure 15B:
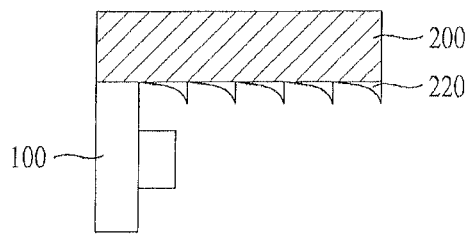
Figure 15C:
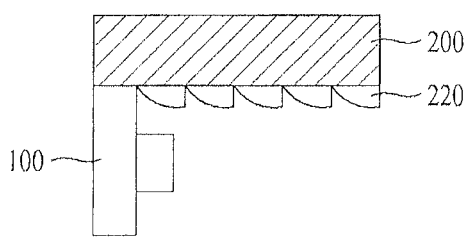

FIG. 15A illustrates a saw-tooth shaped reflective pattern 220 having flat saw-tooth surfaces, and FIGS. 15B and 15C illustrate saw-tooth shaped reflective patterns 220 each having curved saw-tooth surface.

In this instance, the curved saw-tooth surfaces of the reflective pattern 220 in FIG. 15B is curved upward, and the curved saw-tooth surfaces of the reflective pattern 220 in FIG. 15CB is curved downward.

Figure 15D:
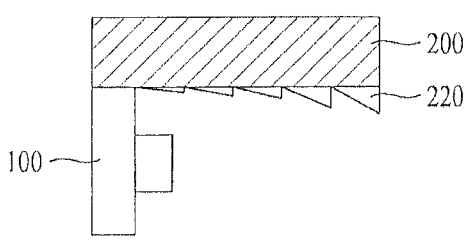

Referring to FIG. 15D, depending on cases, a size of the reflective pattern 220 can become the greater gradually as the reflective pattern 220 goes toward the open region from the end of the first reflective portion 200 the more.

The reflective pattern 220 is formed on the first reflective portion 200, not only for reflection of the light, but also for providing a diffusion effect in which the light spread uniformly.

Therefore, the reflective pattern 220 can be provided to a relevant region in a variety of sizes according to an overall brightness distribution of the backlight unit.

Figure 16:
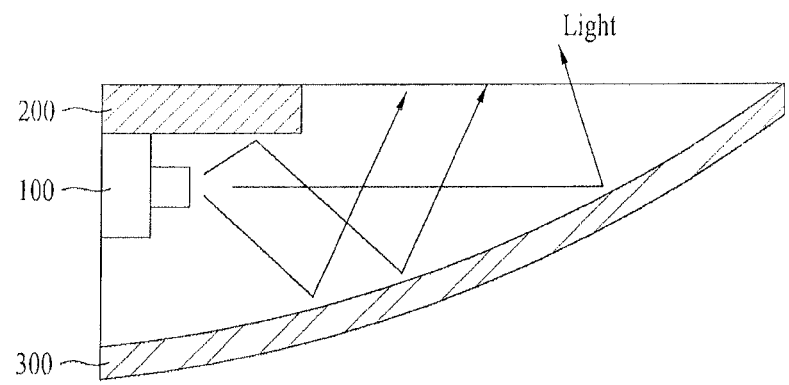
FIGS. 16 and 17 illustrate schematic views each showing one edge type backlight unit in accordance with a preferred embodiment of the present invention.
Figure 17:
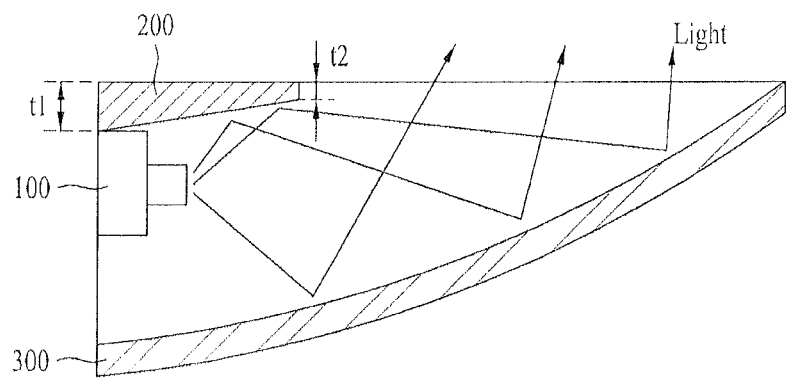

FIGS. 16 and 17 illustrate schematic views each showing one edge type backlight unit in accordance with a preferred embodiment of the present invention, wherein FIG. 16 illustrates a schematic view of the one edge type backlight having the first reflective portion without the sloped surface, and FIG. 17 illustrates a schematic view of the one edge type backlight having the first reflective portion the sloped surface.

Referring to FIG. 16, the first reflective portion 200 has one side region opened, and the light source module 100 can be arranged at an edge region of the other side of the first reflective portion 200.

The one edge type backlight unit in FIG. 16 can use types of the light source module 100 and the first and second reflective portions 200 and 300 different from the two edge type backlight unit in FIG. 1A.

For an example, it is preferable that the intensity of the light from the light source module 100 used in the one edge type backlight unit is greater than the light source module 100 used in the two edge type backlight unit.

In this case, if the light source module 100 having a relatively high light emission is used, it is required that the thickness and the length of the first reflective portion 200 are greater than the first reflective portion 200 used in the two edge type backlight unit.

And, referring to FIG. 17, it is preferable that the first reflective portion 200 used in the one edge type backlight unit has the sloped surface.

This is for obtaining overall uniform brightness by reflecting the light from the light source module 100 far from the light source module 100.

Accordingly, the thickness t1 at one side end of the first reflective portion 200 can be thicker than the thickness t2 at the other side end of the first reflective portion 200.

That is, the first reflective portion 200 can be formed to have a thickness which decreases as the first reflective portion 200 goes the farther from the light source module 100.

In this instance, the sloped surface of the first reflective portion 200 can be sloped at 1~85 degrees from a horizontal plane parallel to the other side surface of the first reflective portion 200.

And, the first reflective portion 200 can be formed of a reflective coating film, or a reflective coating material layer.

Figure 18:
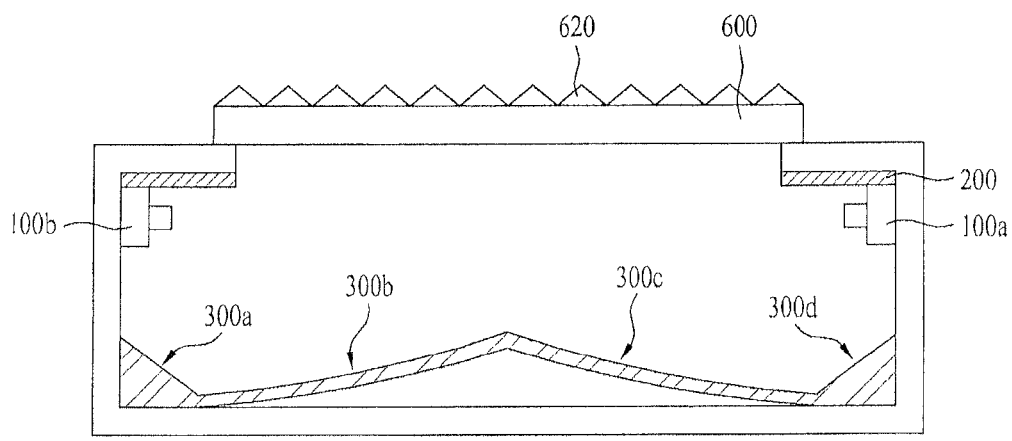
FIG. 18 illustrates a schematic view showing an arrangement of an optical sheet.
Figure 19:
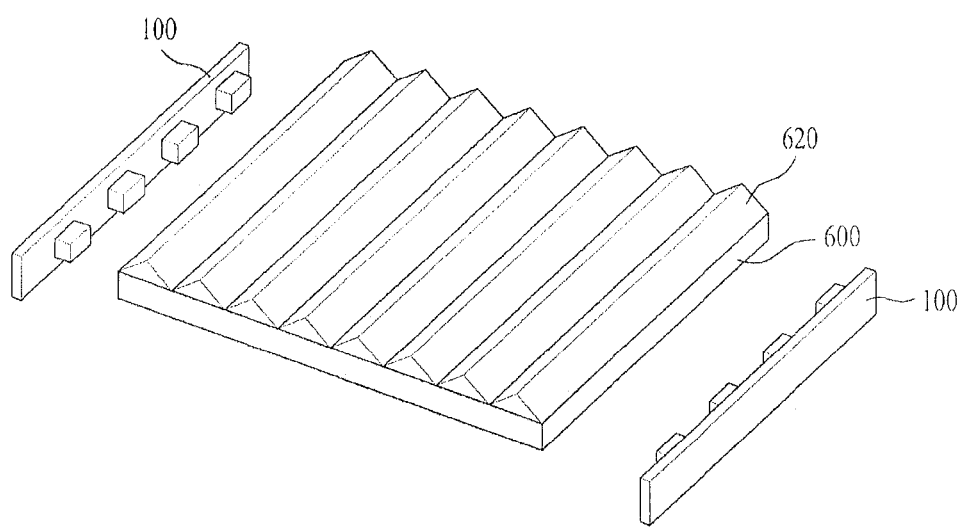
FIG. 19 illustrates a schematic view of a shape of an optical sheet.

FIG. 18 illustrates a schematic view showing an arrangement of the optical sheet, and FIG. 19 illustrates a schematic view of a shape of the optical sheet.

Referring to FIG. 18, the optical sheet 600 can be arranged at the open region of the first reflective portion 200, and have an uneven pattern 620 on an upper surface thereof.

In this instance, the optical sheet 600, provided for diffusing the light through the open region of the first reflective portion 200, can have the uneven pattern 620 formed on the upper surface of the diffusion sheet 600.

Referring to FIG. 19, the uneven pattern 620 can have a strip shape arranged along the light source module 100.

In this instance, the uneven pattern 620 can have projections from a surface of the optical sheet 600 each having a first surface and a second surface opposite to each other with an obtuse or acute angle between the first surface and the second surface.

Referring to FIG. 18, the backlight unit fabricated thus can include the first reflective portion 200 having an open center region, the second reflective portion 300 arranged opposite to an underside surface of the first reflective portion 200 spaced a distance away from the underside surface of the first reflective portion 200 to form an air guide, and first and second light source modules 100a and 100b arranged on opposite regions between the first and second reflective portions 200 and 300 opposite to each other.

In this instance, the second reflective portion 300 can include a first sloped surface 300a positioned on a lower side of the first light source module 100a sloped in the second light source module 100b direction, a second sloped surface 300b extended from the first sloped surface 300a opposite to the first sloped surface 300a sloped in the first light source module 100a direction, a third sloped surface 300c extended from the second sloped surface 300b sloped in the second light source module 100b direction, and a fourth sloped surface 300d extended from the third sloped surface 300c opposite to the third sloped surface 300c positioned on a lower side of the second light source module 100b sloped in the first light source module 100a direction.

In this instance, the first reflective portion can have a reflective pattern different from the second reflective portion.

That is, the first reflective portion can have a reflective surface which reflects the light regularly, and the second reflective portion can have a reflective surface which reflects the light irregularly.

Or, the first reflective portion can have a reflective surface which reflects the light irregularly, and the second reflective portion can have a reflective surface which reflects the light regularly.

And, the first, second, third, and fourth sloped surfaces 300a, 300b, 300c, and 300d can have identical, or different, reflective surfaces.

For an example, the first and fourth sloped surfaces 300a and 300d of the second reflective portion 300 can have reflective surfaces which reflect the light regularly, and the second and third sloped surfaces 300b and 300d of the second reflective portion 300 can have reflective surfaces which reflect the light irregularly.

Or, the first and fourth sloped surfaces 300a and 300d of the second reflective portion 300 can have reflective surfaces which reflect the light irregularly, and the second and third sloped surfaces 300b and 300d of the second reflective portion 300 can have reflective surfaces which reflect the light regularly.

Depending on cases, the second reflective portion 300 of the backlight unit can include a first groove formed between the first sloped surface 300a and the second sloped surface 300b, and a second groove formed between the third sloped surface 300c and the fourth sloped surface 300d.

In this instance, the first groove is formed along the first light source module 100a adjacent to the first light source module 100a, and can have opposite sloped sides.

And, the second groove is formed along the second light source module 100b adjacent to the second light source module 100b, and can have opposite sloped sides.

In this instance, the first groove and the second groove can be formed symmetry with each other with respect to the center region.

In the meantime, the embodiment suggests arranging a light emission surface of the light source module in a variety of directions.

Figure 23A:
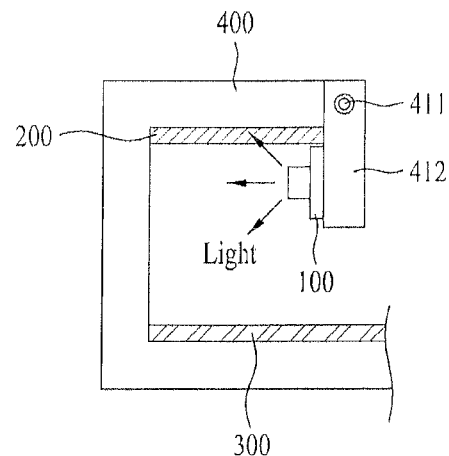
FIGS. 23A to 23G illustrate schematic views each showing a light emission direction of a light source module.
Figure 23B:
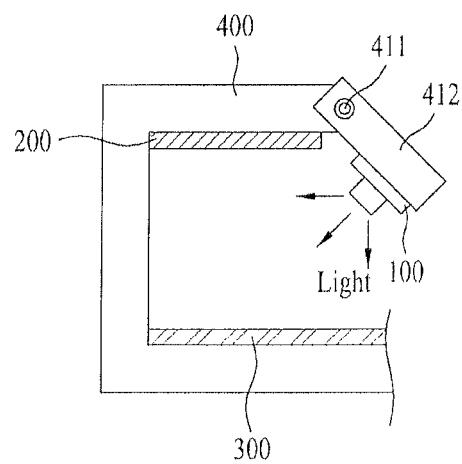
Figure 23C:
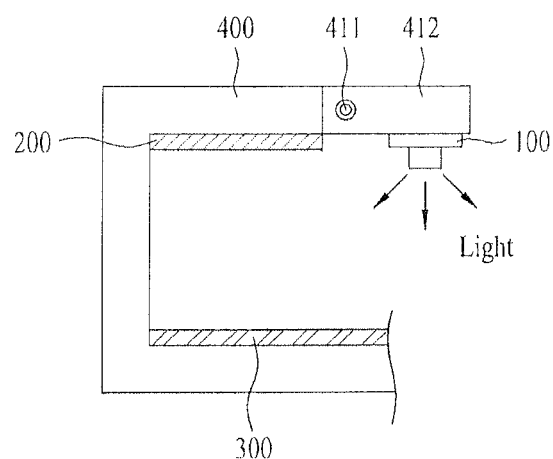
Figure 23D:
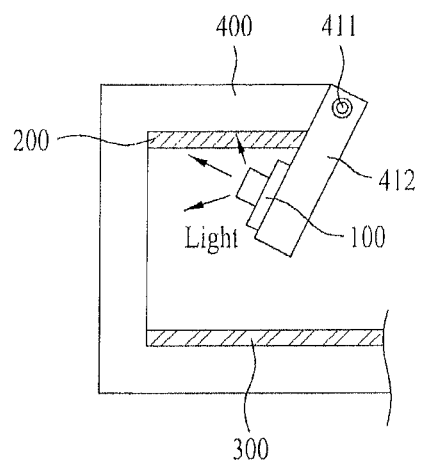
Figure 23E:
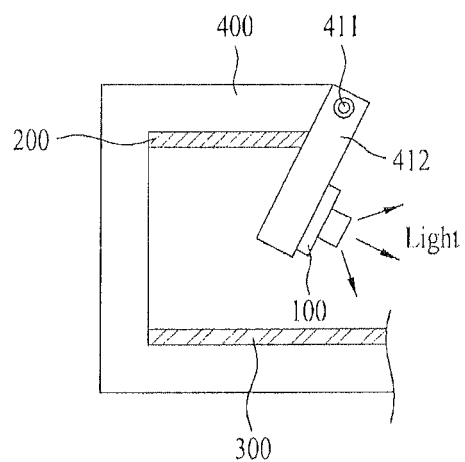

Though FIG. 18 illustrates the light source module 100 having a direct emitting type of the light emission surface in which the light source module 100 faces an inside of the backlight unit, as shown in FIGS. 23a and 23e, the light source module 100 can be arranged to have an indirect emitting type of the light emission surface.

Figure 23F:
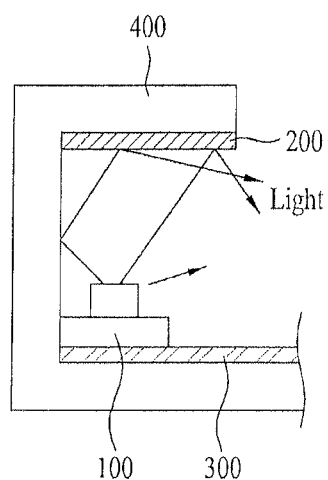
Figure 23G:
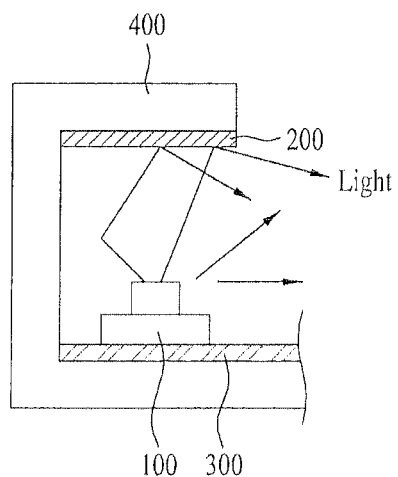

That is, referring to FIG. 18, though the light source module 100 can be attached to the cover frame 400 directly, as shown in FIGS. 23a and 23G, the light source module 100 is attached to a rotatable frame 412, and, in turn, the rotatable frame 412 is fastened to the cover frame 400 with a rotation adjusting screw 411.

FIGS. 23A to 23G illustrate schematic views each showing the light emission direction of the light source module, wherein FIG. 23A illustrates the rotatable frame 412 turned by 90 degrees from the cover frame 400, arranging the light emission surface of the light source module 100 to a side direction of the cover frame 400.

The light from the light source module 100 can be reflected at the cover frame 400, the first reflective portion 200, or the second reflective portion 300, and travel to an inside direction of the backlight unit.

The light source module 100 is arranged in such an indirect emitting type for reducing a hot spot phenomenon.

Next, FIG. 23B illustrates the rotatable frame 412 turned by 135 degrees from the cover frame 400, arranging the light emission surface of the light source module 100 in side and bottom surface directions of the cover frame 400.

And, FIG. 23C illustrates the rotatable frame 412 turned by 180 degrees from the cover frame 400, arranging the light emission surface of the light source module 100 in the bottom surface directions of the cover frame 400.

Next, FIG. 23D illustrates the rotatable frame 412 turned by 45 degrees from the cover frame 400, arranging the light emission surface of the light source module 100 in upper and side surface directions of the cover frame 400, and FIG. 23E illustrates the rotatable frame 412 turned by 45 degrees from the cover frame 400, arranging the light emission surface of the light source module 100 in the bottom surface direction of the cover frame 400 and the inside direction of the backlight unit.

Thus, the light source module 100 can have the light emission surface arranged in a variety of directions by rotating the rotatable frame 412.

In addition to this, the light source module 100 can be positioned on the bottom plate of the cover frame 400.

Referring to FIGS. 23F and 23G, the light source module is positioned on the bottom plate of the cover frame 400, arranging the light emission surface of the light source module 100 in an upper surface direction of the cover frame 400 and in an inside direction of the backlight unit.

In this instance, the light source module 100 can be in contact with the side surface of the cover frame 400 as shown in FIG. 23F, or the light source module can be arranged spaced from the side surface of the cover frame 400 as shown in FIG. 23G.

And, in order to make a thickness of the backlight unit slim further, the embodiment suggests the light source module 100 arranging in contact with, or adjacent to, the second reflective portion 300.

In this case, since the optical sheet is required to secure a predetermined air guide, the optical sheet is not arranged on the first reflective portion 200 as shown in FIG. 18, but is required to be supported by the supporting frame of the cover frame.

Figure 24:
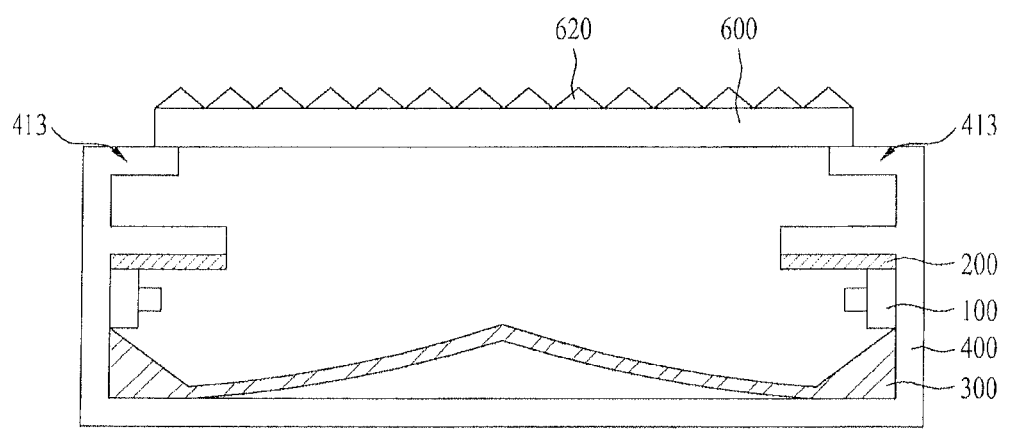
FIG. 24 illustrates a schematic view of an optical sheet supported on a cover frame.

FIG. 24 illustrates a schematic view of the optical sheet supported on the cover frame.

Referring to FIG. 24, the cover frame 400 can have a supporting frame 413 for supporting the optical sheet 600, additionally.

And, the optical sheet 600 can be supported by the supporting frame 413 of the cover frame 400.

The optical sheet 600 is arranged thus for securing an air guide between the second reflective portion 300 and the optical sheet 600.

Referring to FIG. 24, by arranging the light source module 100 adjacent to the second reflective portion 300, the thickness of the backlight unit can be reduced, and by securing the air guide between the optical sheet 600 and the second reflective portion 300, uniform brightness is obtainable.

Figure 20:
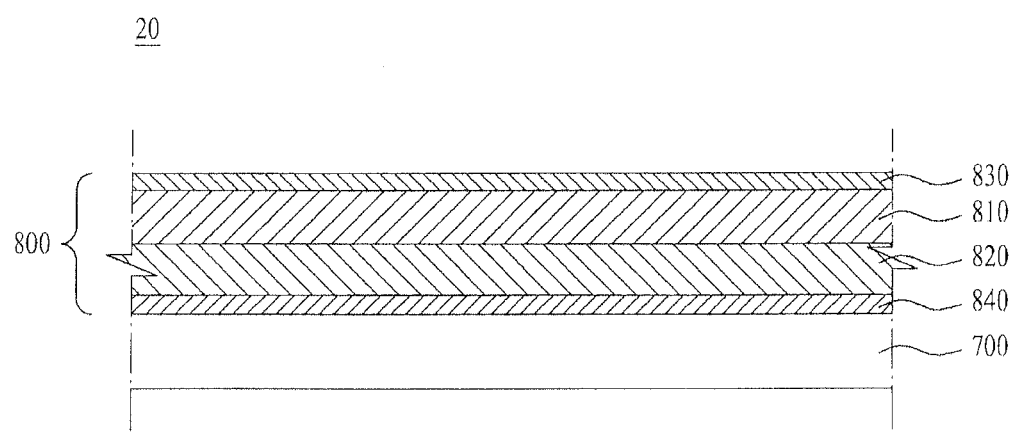
FIG. 20 illustrates a schematic view of a display module having a backlight unit in accordance with a preferred embodiment of the present invention.

FIG. 20 illustrates a schematic view of a display module having a backlight unit in accordance with a preferred embodiment of the present invention.

Referring to FIG. 20, the display module 20 can include a display panel 800 and a backlight unit 700.

The display panel 800 includes a color filter substrate 810 and a TFT (Thin Film Transistor) substrate 820 bonded together to face each other for maintaining a uniform cell gap, and there can be a liquid crystal layer (not shown) disposed between the two substrates 810 and 820.

The color filter substrate 810 includes a plurality of pixels each having a red R, a green G, and a blue B sub-pixels, for producing an image relevant to colors of red, green and blue when a light is applied thereto.

Though each of the pixels can have the red R, the green G, and the blue B sub-pixels, each of the pixels can have sub-pixels not limited to above, but the each of the pixels can have the red R, the green C, the blue B and a white W sub-pixels.

The TFT substrate 820 is an element having switching devices formed thereon, for switching pixel electrodes (not shown).

For an example, a common electrode (not shown) and the pixel electrode can change orientation of molecules of the liquid crystal layer according to a predetermined voltage applied thereto from an outside.

The liquid crystal layer has a plurality of liquid crystal molecules, and the liquid crystal molecules change the orientation matched to a voltage difference taken place between the pixel electrode and the common electrode.

According to this, the light provided from the backlight unit 700 can be incident on the color filter substrate 810 in conformity with the change of orientation of the molecules of the liquid crystal layer.

And, the display panel 800 can have an upper polarization plate 830 and a lower polarization plate 840 arranged on upper and lower sides of the display panel 800. In more detail, the upper polarization plate 830 is arranged on an upper surface of the color filter substrate 810, and the lower polarization plate 840 is arranged on an underside surface of the TFT substrate 820.

Though not shown, provided to a side of the display panel 800, there can be gate and data drivers for generating driving signals for driving the panel 800.

Referring to FIG. 20, the display module can be fabricated by putting the backlight unit 700 to the display panel 800 in tight contact.

For an example, the backlight unit 700 can be adhered and secured to the underside surface of the display panel 800, more specifically, to the lower polarization plate 840, and for this, there can be an adhesive layer formed between the lower polarization plate 840 and the backlight unit 700.

By putting the backlight unit 700 to the display panel 800 in tight contact, a total thickness of the display device can be reduced to improve an outside appearance, and a structure and a fabrication process of the display device can be simplified as additional structures for fastening the backlight unit 700 is removed from the display device.

And, the removal of the space between the backlight unit 700 and the display panel 800 enables to prevent the display device from malfunctioning or providing a poor picture quality caused by infiltration of foreign matters into the space.

The backlight unit 700 in accordance with a preferred embodiment of the present invention can be configured to have a stack of a plurality of functional layers of which at least one layer is provided with a plurality of light sources (not shown).

In order to put in tight contact and secure the backlight unit 700 to the display panel 800, the backlight unit 700, more specifically, the plurality of functional layers of the backlight unit 700 can be formed of flexible materials.

The display panel 800 in accordance with a preferred embodiment of the present invention can be divided into a plurality of regions, and as brightness of the light from a region of the backlight unit 700, i.e., brightness of a light source is controlled according to a gray peak value or a chromaticity signal of each of the divided regions, the brightness of the display panel 800 can be controlled.

For this, the backlight unit 700 can be operated divided into a plurality of divided driving regions matched to the divided regions of the display panel 800.

Figure 21:
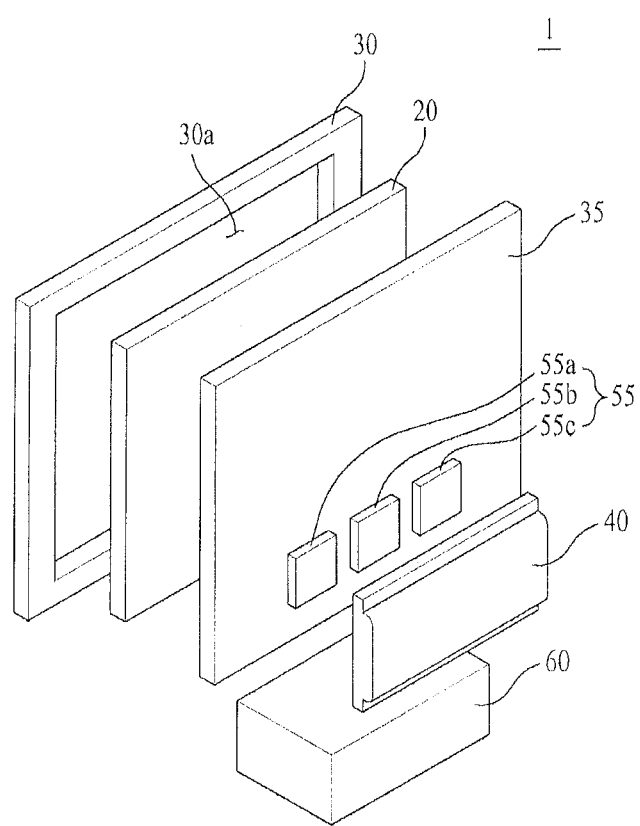
FIGS. 21 and 22 illustrate schematic views each showing a display device in accordance with a preferred embodiment of the present invention.
Figure 22:
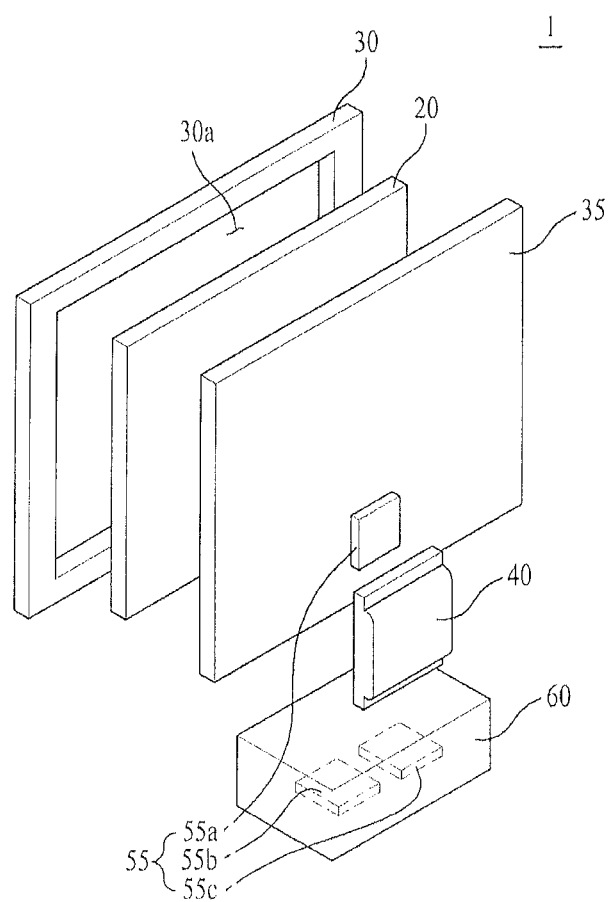

FIGS. 21 and 22 illustrate schematic views each showing a display device in accordance with a preferred embodiment of the present invention.

Referring to FIG. 21, the display device 1 can include a display module 20, a front cover 30 and a back cover 35 for enclosing the display module 20, a driving unit 55 provided to the back cover 35, and a driving unit cover 40 for covering the driving unit 55.

The front cover 30 can include a front panel (not shown) of a transparent material spaced from the display module 20 to transmit a light, for protecting the display module 20 and transmitting the light from the display module 20 enabling to make the image displayed on the display module 20 visible from an outside of the display device 1.

And, the front cover 30 can be formed as a flat plate without a window 30a.

In this case, the front cover 30 is formed of a transparent material which transmits the light, for an example, injection molded plastic.

If the front cover 30 is flat, a frame can be removed from the front cover 30.

The back cover 35 can be coupled to the front cover 30 for protecting the display module 20.

There is the driving unit 55 arranged on one surface thereof.

The driving unit 55 can include a driving control unit 55a, a main board 55b, and a power supply unit 55c.

The driving control unit 55a can be a timing controller, for controlling operation timing of driver ICs in the display module 20, the main board 55b is driving unit for forwarding a V synchronizing signal, an H synchronizing signal, and R, G, B resolution signals to the timing controller, and the power supply unit 55c is a driving unit for applying power to the display module 20.

The driving unit 55 is provided to the back cover 35 and can be covered with the driving unit cover 40.

The back cover 35 has a plurality of holes provided therein for connecting the display module 20 to the driving unit 55, and can have the stand 60 for supporting the display unit 1.

Opposite to this, referring to FIG. 22, the driving control unit 55a of the driving unit 55 can be provided to the back cover 35, and the main board 55b and the power supply unit 55c can be provided to the stand 60.

And, the driving unit cover 40 can cover the driving unit 55 provided to the back cover 35.

Though the embodiment suggests separate main board 55*b* and power supply unit 55*c*, the main board 55*b* and the power supply unit 55*c* can be united as one unit of board, but the present invention does not limit to this.

As has been described, the backlight unit of the present invention has the following advantages.

Since the light from the light source can be reflected uniformly to provide uniform brightness by using the first reflective portion having a reflective surface parallel to a horizontal plane and a reflective portion having a reflective portion with a surface sloped at an angle from the horizontal surface, no additional mechanical unit is required.

Eventually, since a production cost of the backlight unit becomes low and a total weight becomes light, and uniform brightness can be provided, economy and reliability of the backlight unit can be improved.

Features, structures, effects, and so on described in above embodiments are included to at least one of embodiments, but not limited to only one embodiment invariably. Furthermore, it is apparent that the features, the structures, the effects, and so on illustrated in the embodiments can be combined, or modified with other embodiments by persons skilled in this field of art. Therefore, it is required to understand that such combination and modification is included to scope of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A lighting device comprising:
    a first reflector;
    a second reflector; and
    at least one light source between the first and second reflectors,
    wherein the first reflector includes at least one reflecting surface that reflects light from the at least one light source in a first direction towards the second reflector,
    wherein the second reflector reflects light from the first reflector in a second direction different from the first direction,
    wherein the at least one light source includes a semiconductor-based light-emitting device,
    wherein the second reflector includes
        a first sub-reflective portion disposed under the at least one light source module and having a first sloped surface, the first sloped surface having a flat surface, and
        a second sub-reflective portion disposed to be connected to an end of the first sub-reflective portion and having a second sloped surface opposite to the first sloped surface, the second sloped surface having a curved surface,
    wherein the first sub-reflective portion and the second sub-reflective portion are not parallel to the first reflector,
    wherein the first sub-reflective portion has a prescribed reflectivity and the second sub-reflective portion has a plurality of reflective surfaces having different reflectivities, and
    wherein the first sub-reflective portion of the second reflector includes different areas having different reflectivities.

2. The lighting device of claim 1, wherein the curved surface is a concave surface.

3. The lighting device of claim 1, wherein the curved surface is a convex surface.

4. The lighting device of claim 1, wherein the light source and the first reflector are spaced by a first distance and the light source and the second reflector are spaced by a second distance different from the first distance.

5. The lighting device of claim 4, wherein the second distance is greater than the first distance.

6. The lighting device of claim 1, wherein the second reflector also reflects light from the light source in the second direction which is not reflected by the first reflector.

7. The lighting device of claim 6, wherein the second sub-reflective portion is not parallel to the at least one reflecting surface of the first reflector, the first and second sub-reflective portions of the second reflector are oriented at different angles to reflect light from the light source.

8. The lighting device of claim 1, wherein a distance between a first point on the second reflector and the light source is greater than a distance between a second point of the second reflector and the light source.

9. The lighting device of claim 1, wherein the at least one reflecting surface of the first reflector includes:
    a first reflecting surface; and
    a second reflecting surface spaced from the first reflecting surface,
    wherein the first and second reflecting surfaces are substantially flat, and wherein the second reflector reflects light in the second direction through a space between the first and second reflecting surfaces of the first reflector.

10. The lighting device of claim 9, wherein the second reflector includes:
    a third sub-reflective portion having a third sloped surface, the third sloped surface having a flat surface; and
    a fourth sub-reflective portion disposed to be connected to an end of the third sub-reflective portion and having a fourth sloped surface opposite to the third sloped surface, the fourth sloped surface having a curved surface,
    wherein the first sub-reflective portion is aligned with the first reflecting surface of the first reflector and the third sub-reflective portion is aligned with the second reflecting surface of the first reflector.

11. The lighting device of claim 10, wherein a distance between the space between the first and second reflecting surfaces and a point where the second and fourth sub-reflective portions contact each other is less than a distance between the space between the first and second reflecting surfaces and any other point on the second or fourth sub-reflective portion.

12. The lighting device of claim 10, wherein the at least one light source includes:
    a first light source between the first reflecting surface and the first sub-reflective portion; and
    a second light source between the second reflecting surface and the third sub-reflective portion,
    wherein the second and fourth sub-reflecting portions reflect light along converging paths that pass through the space between the first and second reflecting surfaces.

13. The lighting device of claim 9, wherein portions of the first reflector that include respective ones of the first and second reflecting surfaces have different thicknesses.

14. The lighting device of claim 9, wherein portions of the first reflector that include respective ones of the first and second reflecting surfaces are tapered.

15. A backlight unit including a lighting device as recited in claim 1.

16. The lighting device of claim 1, wherein a first height extends from a lower side horizontal plane positioned at one side end of the second reflector to a projected portion positioned at substantially a center region of the second reflector,
wherein a second height extends from the horizontal plane to the light source,
wherein a third height extends from the horizontal plane to the first reflector, and
wherein the first height is smaller than the second height and third height.

17. The light device of claim 1, wherein the first sub-reflective portion is provided toward a lateral end of a body of the light device and the second sub-reflective portion is provided adjacent to the first sub-reflective portion toward a central region of the body.

18. The light device of claim 1, wherein the plurality of reflective surfaces of the second sub-reflective portion having different reflectivities are reflective layers provided adjacent to each other and formed in a prescribed pattern.

19. A lighting device comprising:
a first reflector;
a second reflector; and
at least one light source between the first and second reflectors,
wherein the first reflector includes at least one reflecting surface that reflects light from the at least one light source in a first direction towards the second reflector,
wherein the second reflector reflects light from the first reflector in a second direction different from the first direction,
wherein the at least one light source includes a semiconductor-based light-emitting device,
wherein the second reflector includes
a first sub-reflective portion disposed under the at least one light source module and having a first sloped surface, the first sloped surface having a flat surface, and
a second sub-reflective portion disposed to be connected to an end of the first sub-reflective portion and having a second sloped surface opposite to the first sloped surface, the second sloped surface having a curved surface,
wherein the first sub-reflective portion and the second sub-reflective portion are not parallel to the first reflector,
wherein the second sub-reflective portion has a prescribed reflectivity and the first sub-reflective portion has a plurality of reflective surfaces having different reflectivities, and
wherein the first sub-reflective portion of the second reflector includes different areas having different reflectivities.

* * * * *